(12) United States Patent
Tutino

(10) Patent No.: US 12,098,743 B2
(45) Date of Patent: Sep. 24, 2024

(54) ANGLED THREADED ROD COUPLING HAVING MOUNTABLE PASS-THROUGH COUPLER AND IMPROVEMENTS THEREOF

(71) Applicant: John C. Tutino, Yardley, PA (US)

(72) Inventor: John C. Tutino, Yardley, PA (US)

( * ) Notice: Subject to any disclaimer, the term of this patent is extended or adjusted under 35 U.S.C. 154(b) by 280 days.

(21) Appl. No.: 17/851,287

(22) Filed: Jun. 28, 2022

(65) Prior Publication Data

US 2022/0325735 A1  Oct. 13, 2022

Related U.S. Application Data

(63) Continuation-in-part of application No. 17/209,529, filed on Mar. 23, 2021, now Pat. No. 11,414,868.

(51) Int. Cl.
*F16B 7/18* (2006.01)
(52) U.S. Cl.
CPC ..................... *F16B 7/18* (2013.01)
(58) Field of Classification Search
CPC .. F16B 7/185; F16B 37/0814; F16B 37/0892; E04C 5/165; E04C 5/167
See application file for complete search history.

(56) References Cited

U.S. PATENT DOCUMENTS

| | | | |
|---|---|---|---|
| 2,377,581 A | 6/1945 | Shaffrey | |
| 2,942,314 A * | 6/1960 | Debner | F16B 7/0433 24/339 |
| 3,006,231 A | 10/1961 | Kahn | |
| 4,861,081 A * | 8/1989 | Satoh | E05B 79/12 292/336.3 |
| 4,900,184 A * | 2/1990 | Cleveland | E04C 5/168 24/339 |
| 5,351,920 A * | 10/1994 | Decky | F16L 3/13 248/74.1 |
| 5,967,691 A | 10/1999 | Lancelot, III | |
| 6,631,876 B1 * | 10/2003 | Phillips | F16B 2/22 248/74.2 |
| 9,388,575 B1 | 7/2016 | Gomez | |
| 10,018,216 B1 * | 7/2018 | Espinosa | F16B 37/0814 |
| 11,432,481 B2 * | 9/2022 | Drechsel | A01G 25/023 |
| 2011/0047915 A1 * | 3/2011 | Waters, Jr. | E04C 5/201 52/719 |

FOREIGN PATENT DOCUMENTS

DE  102011052065 A1 *  1/2013  ............. E04C 5/167

\* cited by examiner

*Primary Examiner* — Adriana Figueroa
(74) *Attorney, Agent, or Firm* — Ernesto Garcia

(57) ABSTRACT

An angled coupling including a main pass-through coupler to allow a first threaded rod to pass therethrough and a second coupling extending at angle therefrom to receive second threaded rod. The main coupler is configured to be secured to any location on the first threaded rod without requiring it to be screwed onto first threaded rod. The main coupler includes a first half and a second half spaced from each other that can be secured together at desired location on first threaded rod. The main coupler includes an upper section having a first approximately half of body thereof and corresponding threads and lower section having a second approximately half of body, opposite the first half, and corresponding threads. The first threaded rod is retained in both halves by insertion and rotation until the threaded rod snaps in place and kept fixed with retaining clips.

14 Claims, 13 Drawing Sheets

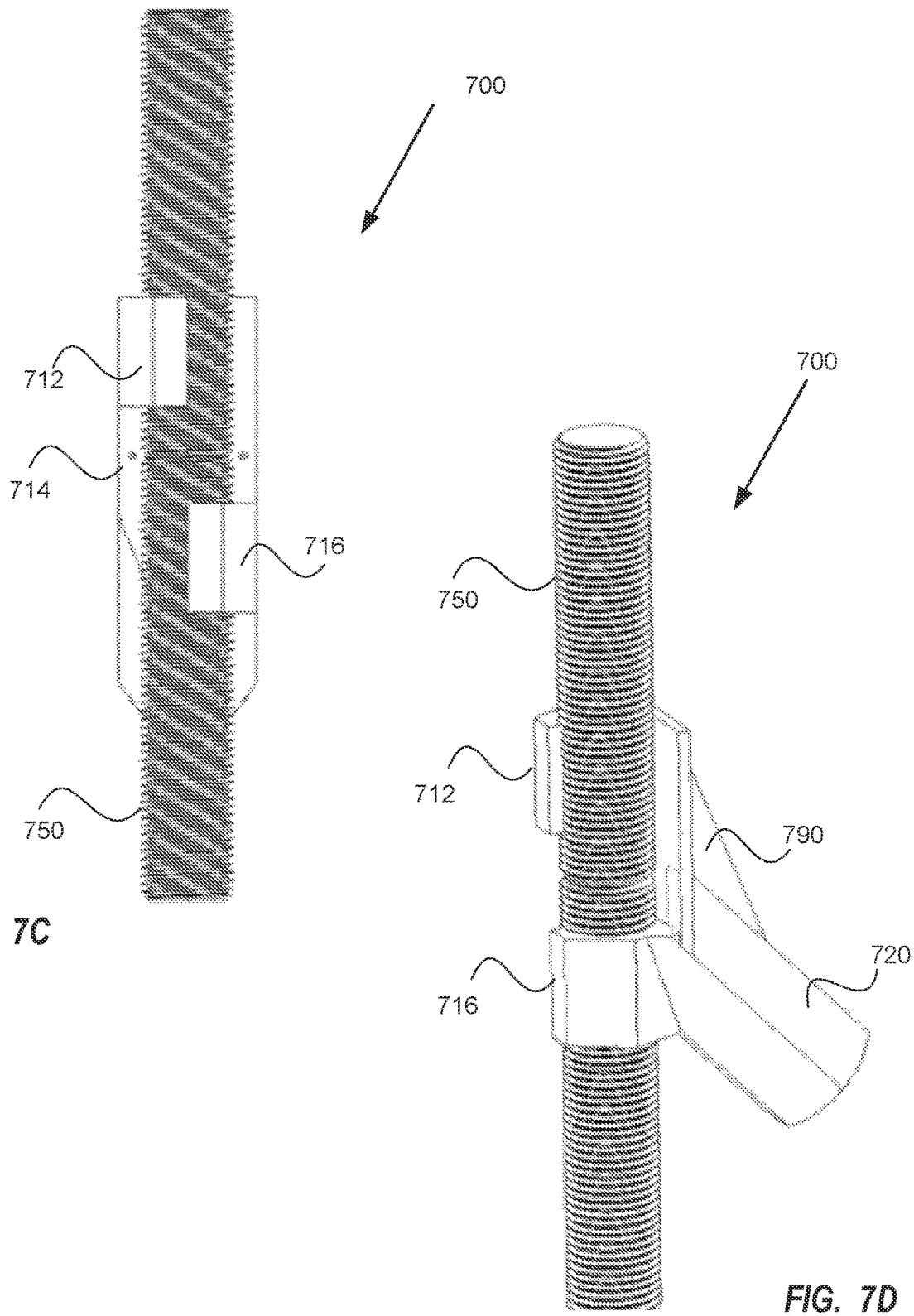

ively.
ANGLED THREADED ROD COUPLING HAVING MOUNTABLE PASS-THROUGH COUPLER AND IMPROVEMENTS THEREOF This application is a continuation-in-part (CIP) and claims the benefit under 35 USC § 120 of U.S. Utility application Ser. No. U.S. Ser. No. 17/209,529 filed on Mar. 23, 2021, which is a continuation in part (CIP) and claims the benefit under 35 USC § 120 of U.S. Utility application Ser. No. 15/930,201 filed on May 12, 2020. Application Ser. No. 15/930,201 claimed the benefit under 35 USC § 119 of U.S. Provisional Application 62/847,795 filed on May 14, 2019. Application Ser. No. 15/930,201 and 62/847,795 are herein incorporated by reference in their entirety.

BACKGROUND

Threaded rod is commonly used in the construction industry. The threaded rod can be used, for example, to support various items. The threaded rod is typically mounted to a ceiling and/or floor and then connected to some type of support member (e.g., rail, bracket). The support member is to, for example, provide support, hold and/or secure to an object (e.g., plumbing. HVAC). The threaded rod may be secured to the floor and/or ceiling by threading it into a support (anchor bolt, insert) that is mounted to the floor/ceiling, where the support includes an internally threaded receiving portion. The threaded rod may be secured to a connection point on the support member with, for example, one or more threaded through bolts. Basically, the threaded rod is for the purpose of fastening anything to the floor/ceiling using the mounted support and a through bolt. The floor/ceiling mounted support should be aligned with the connection point on the support member so that the threaded rod runs in a substantially straight line therebetween.

What is needed, is an easier and more convenient way to adjust the threaded rod so that it can be used in situations where a mounted support and a connection point are not aligned or where multiple pieces of threaded rod need to be connected in some fashion. What is needed is an angled coupling that can receive multiple pieces of threaded rod in order to adjust the location of the threaded rod without the need to heat and bend the rod as discussed above. Furthermore, such an angled coupling could be used for seismic restraints and/or storm surge restraints.

Furthermore, an improvement to anchoring a threaded rod will be to utilize a rotatable coupler wherein the threaded rod crosses freely and is rotatable to engage an upper portion and a bottom portion of the coupler having a retaining feature so that the threaded rod engages against a thread in both the upper portion and the bottom portion and the threaded rod is able to be adjusted, while the retaining feature prevents the threaded rod from disengaging of the upper portion and the bottom portion.

BRIEF DESCRIPTION OF DRAWINGS

The features and advantages of the various embodiments will become apparent from the following detailed description in which:

FIGS. 7A-7D illustrate several views of an example twist-on angled coupling, according to one embodiment.

DETAILED DESCRIPTION

Figure 1:
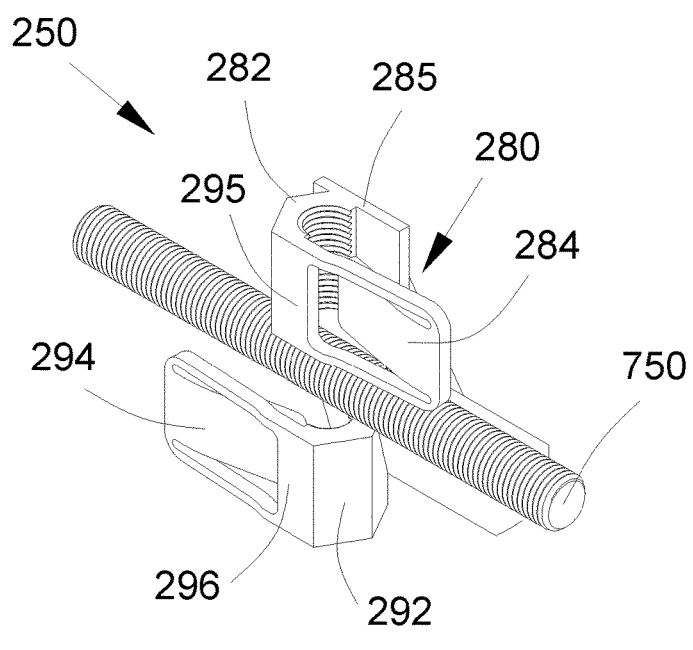
FIG. 1 shows the improvement of a coupler before a threaded rod is locked in place.
Figure 3A:
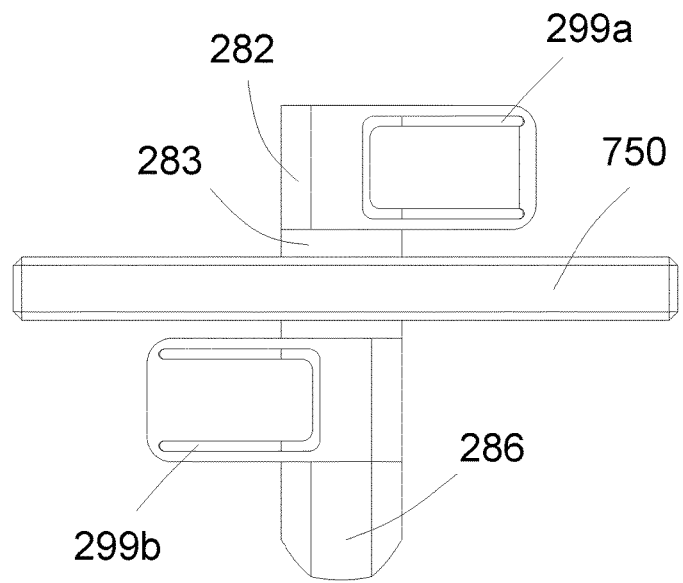
FIG. 3A shows a front view of the coupler shown in FIG. 1.
Figure 3B:
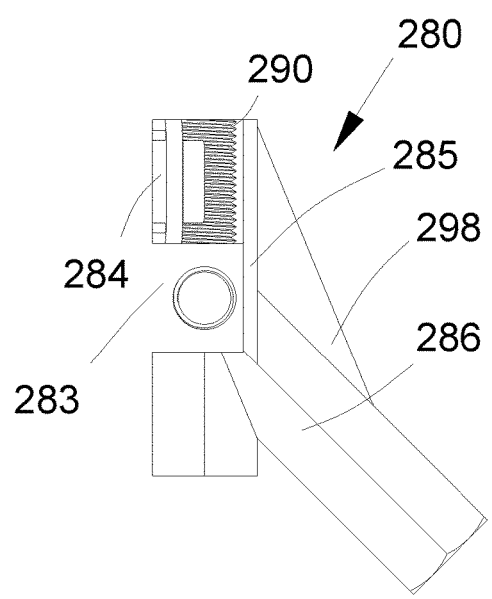
FIG. 3B shows a side view of the coupler shown in FIG. 1.

FIG. 1 shows coupler system 250 comprising a coupler 280 and a threaded rod 750 going across before being engaged. The coupler 280 comprises a first portion 282 and a second portion 292 both spaced apart and axially aligned creating a space 283 therebetween as shown in FIGS. 3A and 3B. Both the first portion 282 and the second portion face in opposite directions and both are connected to a back wall 285 that extends between the first portion 282 and the second portion 292. The first portion 282 and the second portion 292 include an internal thread 290, which arches 180 degrees or less than 180 degrees to be engaged with the threaded rod 750.

Figure 3C:
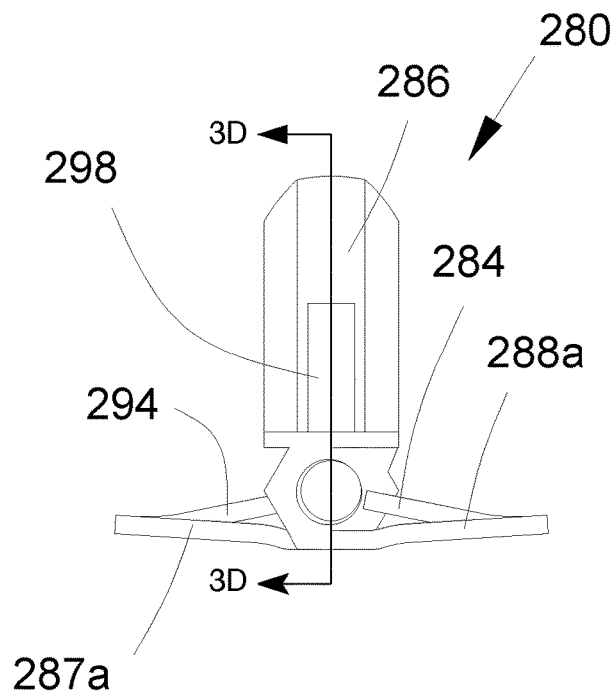
FIG. 3C shows a top view of the coupler shown in FIG. 2.

The first portion 282 includes a retaining feature 284 and the second portion 292 also includes a retaining portion 294 in the shape of a tongue or flap, which project in opposite directions. The retaining portions 284, 294 are formed from an extension 295, 296 projecting from the first portion 282 and the second portion 292 and spaced by a U-shape groove 299*a*, 299*b*, respectively. The U-shape groove 299*a*, 299*b* created two bridges 288*a*, 288*b*, 287*a*, 287*b* in both the extensions 295, 296. The retaining portions 284, 294 are bent towards the center of the thread 292 as shown in FIG. 3C and are flexible to allow passage of the threaded rod 750.

Figure 2:
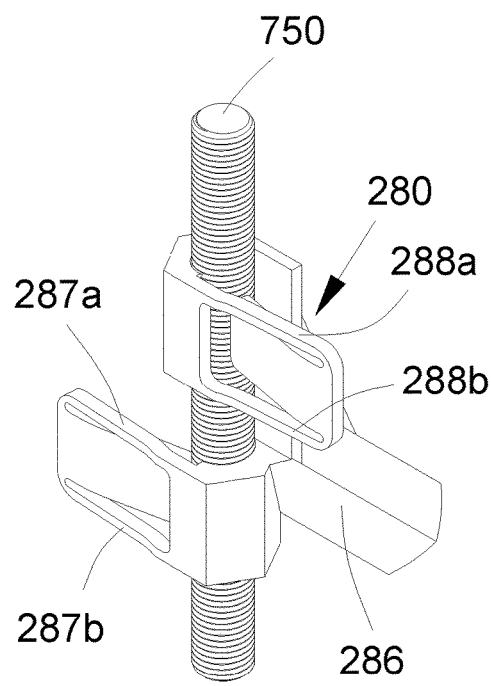
FIG. 2 shows the coupler of FIG. 1 after the threaded rod is locked in place.
Figure 3D:
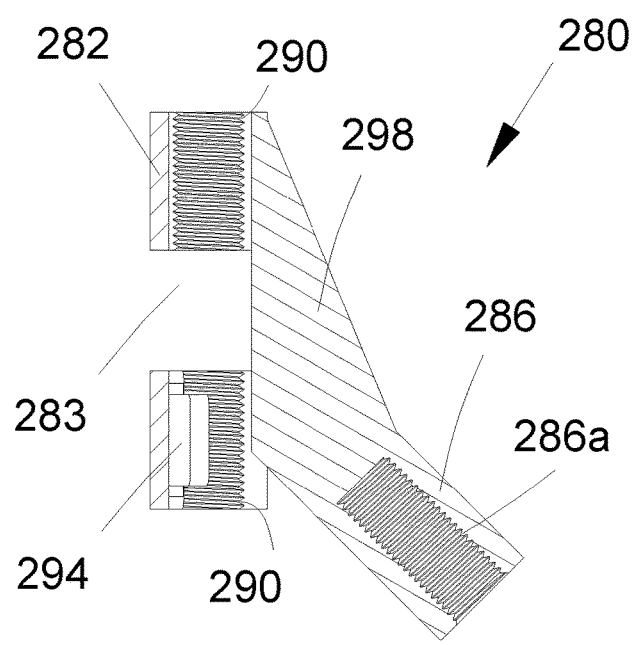
FIG. 3D shows cross-sectional view 3D-3D in FIG. 3C without the threaded rod.

As shown in FIGS. 2 and 3B-3D, the back wall 285 contains an angled receptable 286 having a threaded hole 286*a*, see FIG. 3D. The angled receptacle 286 projects at any angle, but preferably the angled receptacle 286 projects at 45 degrees to the back wall 285. The angled receptable 286 is reinforced with a gusset 298 that extends between the back wall 285 and the receptable 286, it is further envisioned that the angled receptacle 286 is directly connected to the second portion 292.

As shown in FIG. 2, after the threaded rod 750 is placed in the space 283 between the first portion 282 and the second portion 292, the threaded rod 750 is rotated about 90 degrees counterclockwise engaging with the thread 292 of both the first portion 282 and the second portion 292. Simultaneously, the threaded rod 750 engages with the retaining portions 284, 294 thus keeping the threaded rod 750 from disengaging the thread 290 of the first portion 282 and the second portion 292 keeping the threaded rod 750 in the first portion 282 and the second portion 292.

Figure 4A:
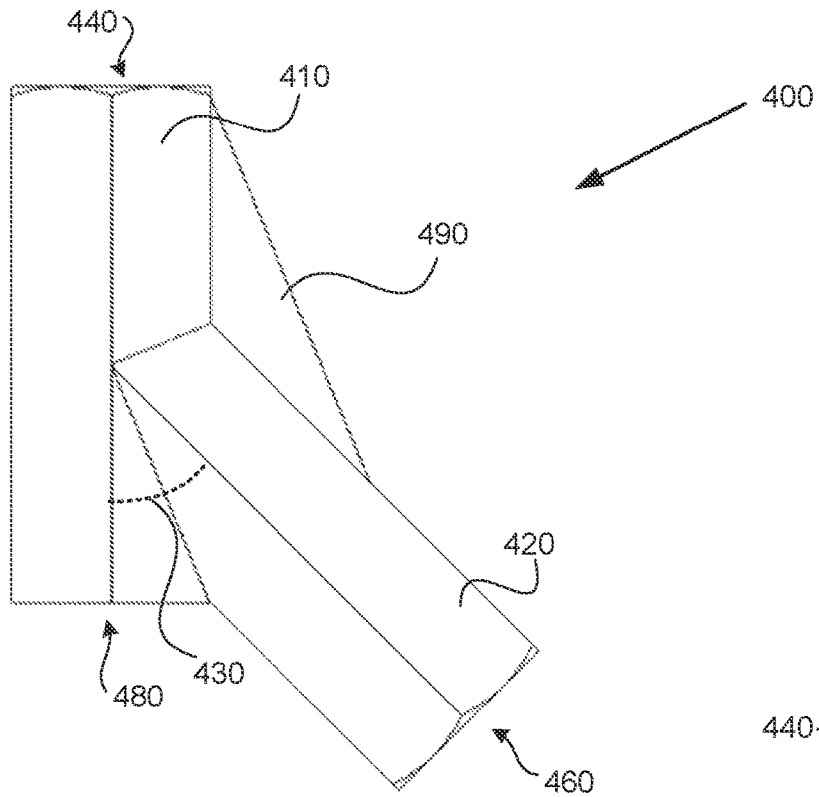
FIGS. 4A-4C illustrate several views of an example angled coupling that could be used to angle the threaded rod rather than bending the rod, according to one embodiment.
Figure 4B:
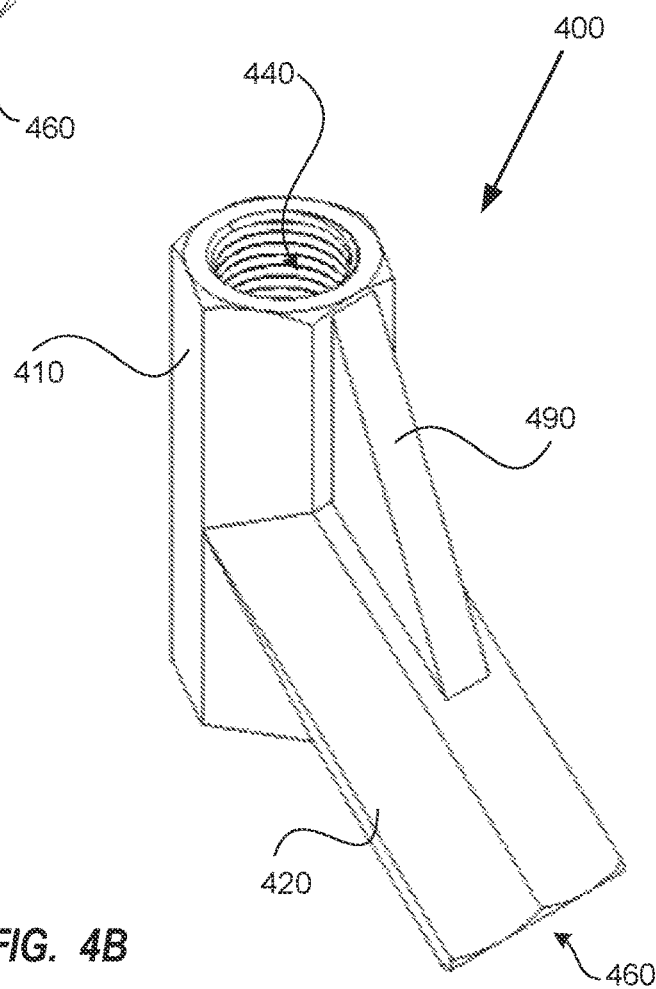
Figure 4C:
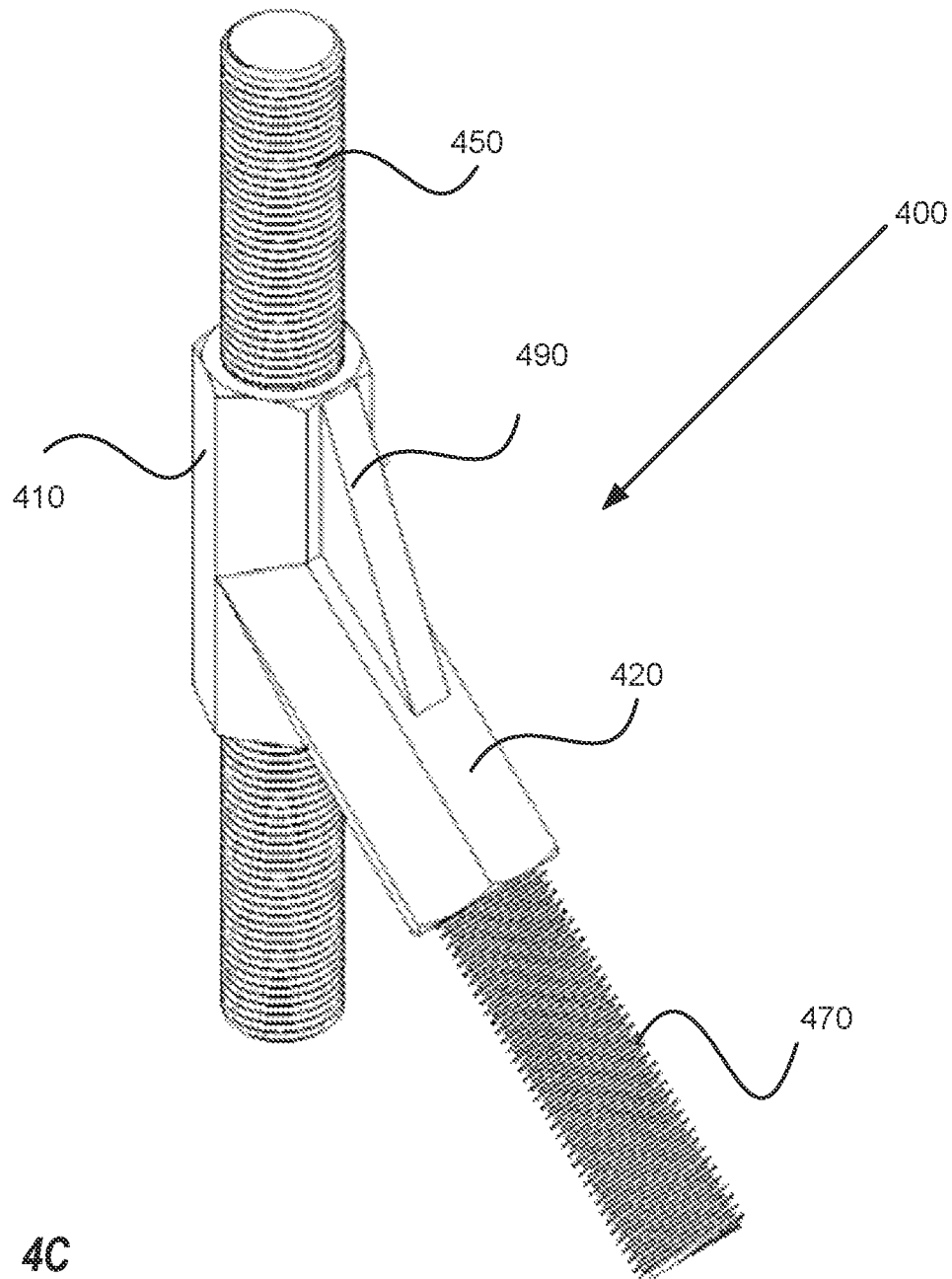

FIGS. 4A-4C illustrate several views of an example angled coupling 400 that could be used to angle the threaded rod rather than bending the rod. The angled coupling 400 includes a first (main) internally threaded receptacle (coupler) 410 and a second internally threaded receptacle (coupler) 420 that is rotated at a 45-degree angle 430 from the first coupler 410. The angle 430 is not limited to 45 degrees, but rather could be other standard angles that may be used in the field (e.g., 30 degrees, 60 degrees). The first coupler 410 may have an opening 440 for receiving a first threaded rod 450. The second coupler 420 may have an opening 460 for receiving a second threaded rod 470 that extends at the 45-degree angle 430 from the first threaded rod 450.

According to one embodiment, the first coupler 410 may include a second opening 480 at an opposite end thereof. The first coupler 410 may be a passthrough coupler where an interior is open from the first opening 440 to the second opening 480. The first coupler 410 may enable the first threaded rod 450 to pass therethrough or may receive a different threaded rod from each side thereof.

According to one embodiment, the second end of the first coupler 410 may be closed so that the first threaded rod 450 is simply secured therewithin. According to one embodiment, in order to provide additional support, a support bracket 490 may be utilized between the two couplers 410, 420.

The size of the openings and the threading (as visible in FIG. 4B) within the couplers 410, 420 of the angled coupling 400 may be based on the type of threaded rod 450, 470 that it is being used. According to one embodiment, the diameter of the openings 440, 460 (and possibly 480) and the threading within each coupler 410, 420 may be the same. However, the invention is in no way limited thereto. Rather, the diameter of the openings 440, 460 (and possibly 480) and/or threading for each of the couplers 410, 420 may be different based on the desired configuration in the field. For example, it may be desired for the second threaded rod 470 to have a larger diameter than the first threaded rod 450.

According to one embodiment, at least one of the couplers 410, 420 may include a plurality of opening diameters so that it can be used with various sized threaded rod. The largest opening may be located closest to the exterior and the smallest may be located furthest from the opening. Larger threaded rod could secure to the threads of the outer opening diameter while smaller threaded rod could pass through the outer opening diameter and be secured to the threads of the inner opening diameter. According to one embodiment, one or more inserts could be utilized to enable the angled coupling 400 to be utilized with threaded rod that is a smaller size than the couplers 410, 420. The various diameter/thread sizes provided by the coupler or the inserts may enable a standard angled coupling 400 to be used in different situations rather than needing different angled couplings for different situations.

According to one embodiment, the angled coupling 400 is made from a high strength material. The materials utilized may include for example, steel, cast iron, composites, high strength plastics, or combinations thereof. According to one embodiment, if the coupling 400 was used in a storm-pipe restraint system it may be made of stainless steel (or other materials with the desired strength and anti-rusting properties) to prevent rusting.

According to one embodiment, the angled coupling 400 may be manufactured with the desired angle 430. Various methods in which the angled coupling 400 may be manufactured (e.g., machined, extruded) are within the current scope. According to one embodiment, the angled coupling 400 may be formed by, for example, welding two straight couplers together (e.g., couplers 410, 420). In order to weld the straight couplers together an end of one or both of the couplers may be cut at a certain angle so that when they are put together the angled coupling 400 has the desired angle 430.

According to one embodiment, the angled coupling 400 may be manufactured with the support bracket 490. According to one embodiment, the support bracket 490 may be manufactured separate and may be added to the angled coupling 400 by, for example, welding.

Figure 5A:
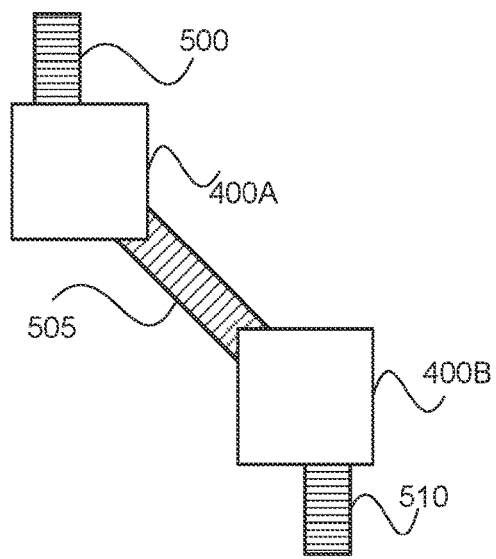
FIGS. 5A-5F illustrate several views of the example angled couplings of FIGS. 4A-4C utilized in practical applications, according to different embodiments.
Figure 5B:
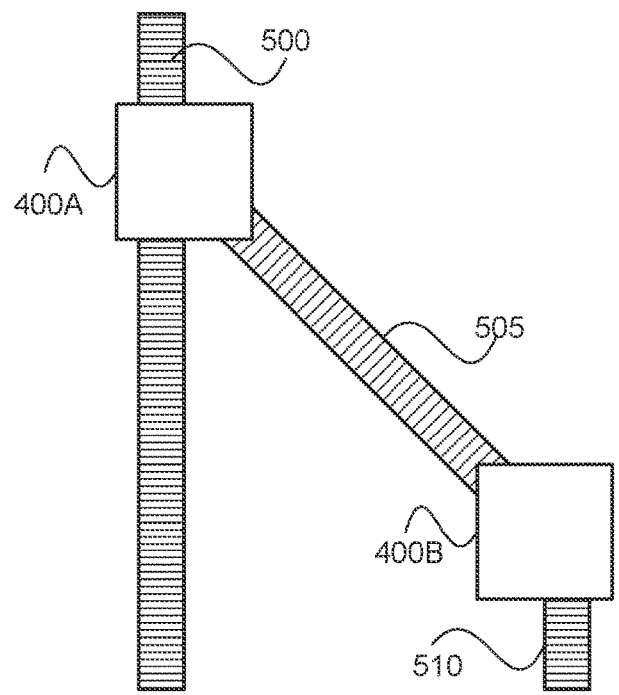

FIGS. 5A-5F illustrate several views of the example angled coupling 400 utilized in practical applications. It should be noted that for ease of illustration the angled coupling 400 is simply illustrated as a box in several of the figures. FIG. 5A illustrates two angled couplings 400A, 400B utilized to shift the threaded rod a certain distance (to the right as illustrated). This type of implementation may be utilized when, for example, a mounted support (not illustrated) in a ceiling (not illustrated) is not aligned with a connection point (not illustrated) in a support member (not illustrated). This type of implementation may be utilized instead of bending the threaded rod as illustrated in FIG. 1B. A first threaded rod 500 extends from the mounted support to a first angled coupling 400 A that receives the first threaded rod 500 square. A second threaded rod 505 extends from the first angled coupling 400 A at a fixed angle (preferably 45 degrees but not limited thereto). The second threaded rod 505 is received at a fixed angle (e.g., 45 degrees) by a second angled coupling 400 B. A third threaded rod 510 extends downward from the second angled coupling 400 B to, for example, be secured to the connection point in the support member. It should be noted that the second angled coupling 400 B is utilized in opposite manner of the first angled coupling 400 A (e.g., it has been rotated around both horizontal and vertical axes so that it receives second threaded rod 505 at upper left as opposed to lower right, and the third threaded rod 510 extends from bottom as opposed to top).

FIG. 58 illustrates the same two angled couplings 400A, 400B being utilized to provide another threaded rod 510 a certain distance away from the threaded rod 500 secured to mounted support in the ceiling (to the right as illustrated). This type of implementation may be utilized when, for example, a mounted support may not be practical or possible to mount in the ceiling above an additional connection point in a support member. In this embodiment, the first threaded rod 500 passes through the first angled coupling 400A so that it can be secured to a first connection point (not illustrated) on the support member (not illustrated) and the third threaded rod 510 can be secured to a second connection point (not illustrated) on the support member (not illustrated). It should be noted that the third threaded rod 510 could be used to secure to other support members rather than the same support member.

Figure 5C:
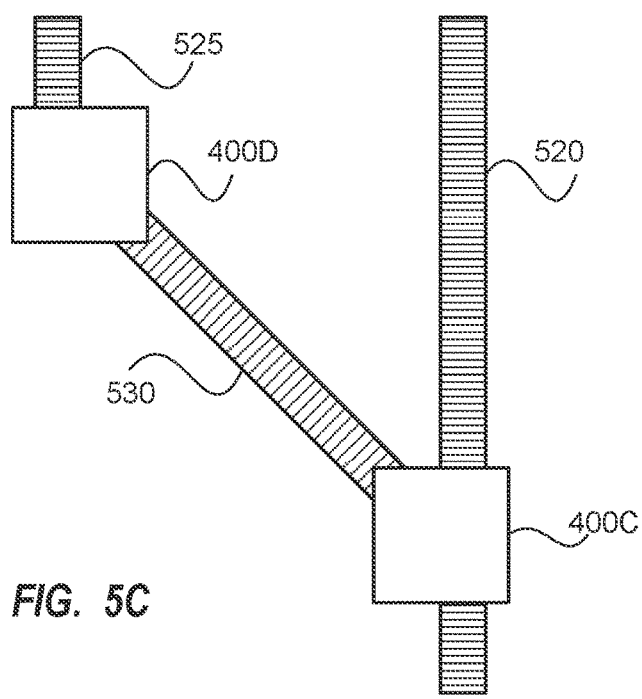

FIG. 5C illustrates two angled couplings 4000, 400D being utilized to provide a seismic restraint system to reduce or eliminate sway in a support member or the object (e.g., pipe) being supported therein. This type of implementation may be utilized, for example, in areas suspectable to earthquakes or in locations that may be susceptible to vibrations or movement. A first threaded rod 520 extends downward from a first mounted support (not illustrated) in a ceiling (not illustrated) in order to secure to a connection point (not illustrated) in a support member (not illustrated) as would typically be the case. However, the first threaded rod 520 passes through a first angled coupling 4000. A second threaded rod 525 extends downward from a second mounted support (not illustrated) in the ceiling a certain distance away from the first mounted support (to the left as illustrated). The second rod 525 is received by a second angled coupling 400D. A third threaded rod 530 extends from the second angled coupling 400D at a fixed angle (preferably 45 degrees but not limited thereto). The third threaded rod 530 is received at a fixed angle (e.g., 45 degrees) by the first angled coupling 4000. The third threaded rod 530 provides the sway support for the support member. It should be noted that the second angled coupling 400D is utilized in opposite manner of the first angled coupling 4000.

Figure 5D:
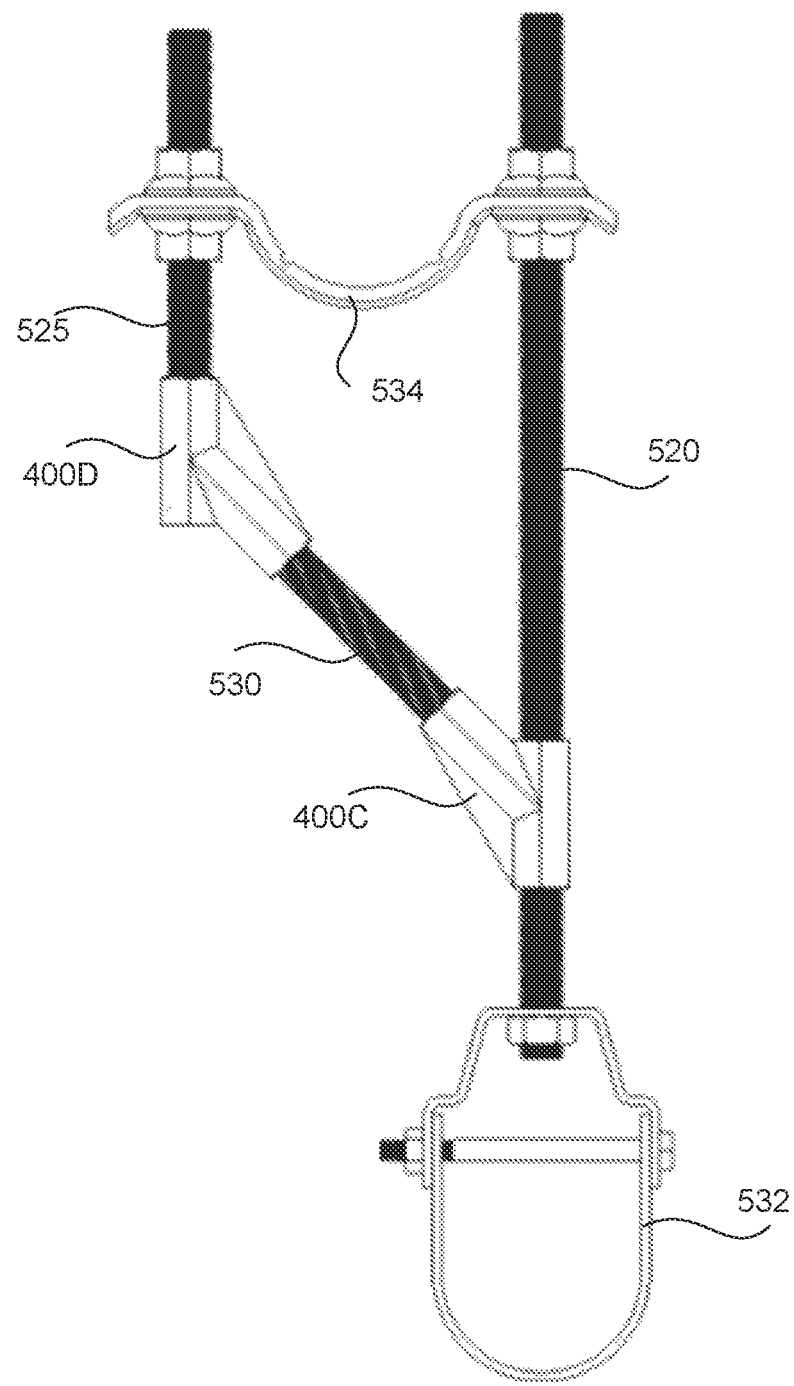

FIG. 5D illustrates a detailed view of the two angled couplings 4000, 400D being utilized. The first threaded rod 520 passes through the first coupler (not labeled) of the first angled coupling 4000 and is secured to a first support member (e.g., clevis hanger) 532 with a nut (not labeled). The second threaded rod 525 is received by the first coupler (not labeled) of the second angled coupling 400D. The third threaded rod 530 extends from the second coupler (not labeled) of the second angled coupling 400D and is received by the second coupler (not labeled) of the first angled coupling 4000. As illustrated, a second support member (e.g., riser clamp) 534 is located between the first and second threaded rods 520, 525. The second support member 534 may be utilized to support a pipe. A pipe located on the second support member 534 may be secured thereto in some fashion.

According to one embodiment, the first and the second threaded rod 520, 525 extend downward from the mounted supports (not illustrated) in the ceiling (not illustrated) and this configuration is utilized to provide a seismic restraint system (sway support) for the first support member 532. According to one embodiment, the first threaded rod 520 extends downward from the mounted supports (not illustrated) in the ceiling (not illustrated) and the third and second threaded rods 530, 525 extend upwards therefrom with the use of the couplings 4000, 400D to provide a second mounting point for the second support member 534.

Figure 5E:
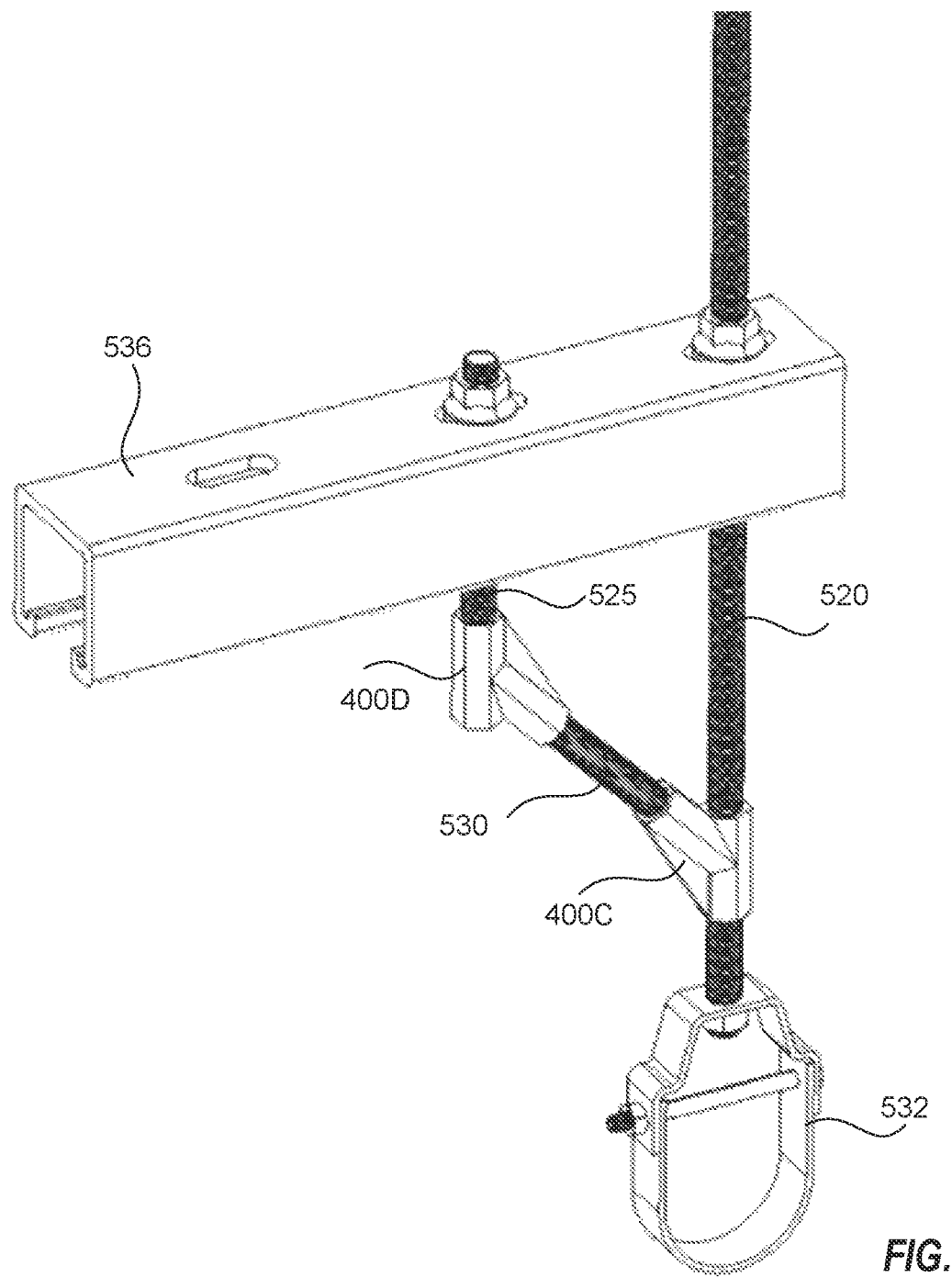

FIG. 5E illustrates a more detailed view of the two angled couplings 400C, 400D being utilized. The first threaded rod 520 extends downward from the mounted supports (not illustrated) in the ceiling (not illustrated). The first threaded rod 520 passes through the first coupler (not labeled) of the first angled coupling 4000 and is secured to a first support member (e.g., clevis hanger) 532 with a nut (not labeled). A second support member (e.g., C-channel strut) 536 extends from the first threaded rod 520. The second threaded rod 525 is secured to the second support member 536 and traverses downward therefrom where it is received by the first coupler (not labeled) of the second angled coupling 400D. The third threaded rod 530 extends from the second coupler (not labeled) of the second angled coupling 400D and is received by the second coupler (not labeled) of the first angled coupling 4000.

According to one embodiment, the use of the second support member 534 enables the second threaded rod 525 to be secured thereto as opposed to being secured to a mount in the ceiling in order top provide a seismic restraint system (sway support) for the first support member 532. According to one embodiment, the third and second threaded rods 530, 525 extending upwards from the first rod 520 provide a second mounting point for the second support member 536. The second support member 536 may be utilized to support a pipe or other objects. A pipe located on the second support member 536 may be secured thereto in some fashion.

Figure 5F:
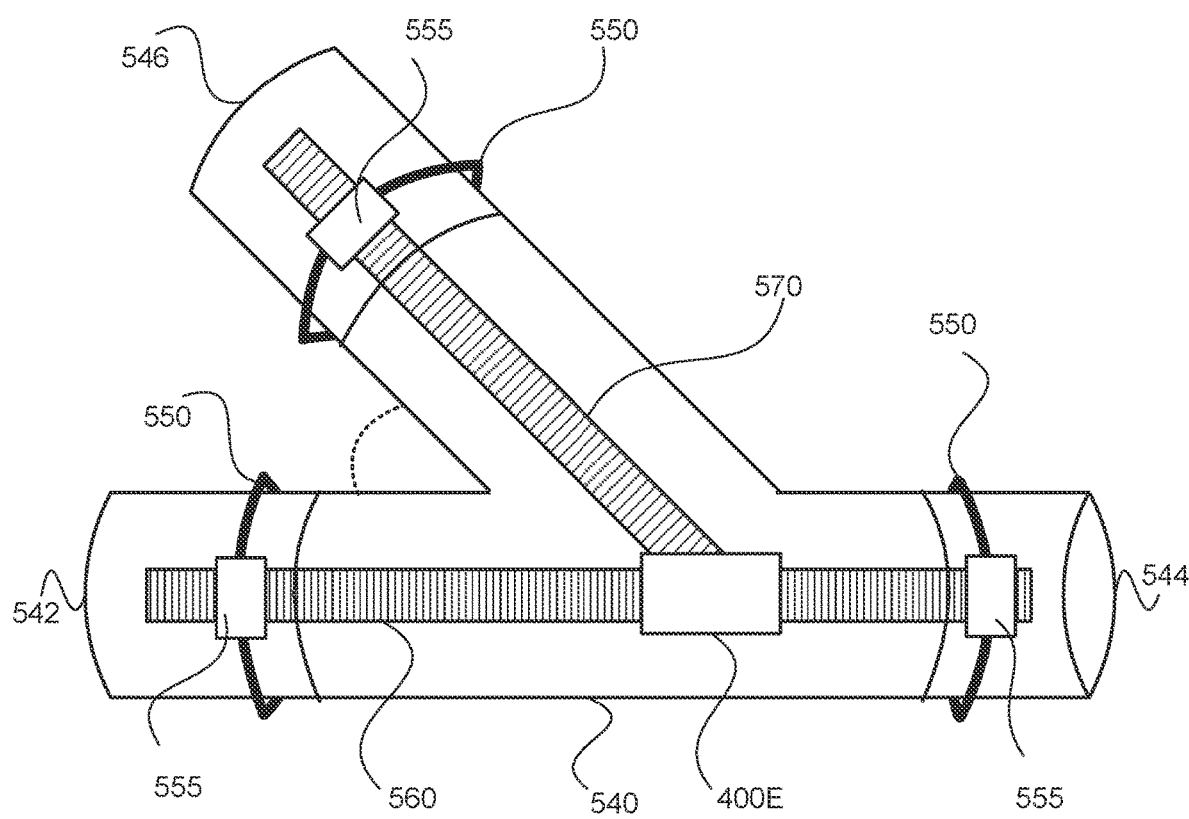

FIG. 5F illustrates an angled coupling 400E being utilized as part of a storm-pipe restraint system to ensure storm pipes do not come apart when a surge flows therethrough. As illustrated, a storm pipe system includes a main storm pipe traversing horizontally and a second storm pipe merging with the first storm pipe via an angled pipe (e.g., 45 degrees) 540. The main storm pipe includes pipes 542, 544 connecting to horizontal ends of the angled pipe 540. The second storm pipe includes a pipe 546 connecting to the angled end of the angled pipe 540. The storm-pipe restraint system is to hold the angled pipe 540 to the other pipes 542, 544, 546 connecting thereto.

The storm-pipe restraint system includes a plurality of brackets 550, a plurality of clamps 555, a plurality of threaded rods 560, 570 and the angled coupling 400E. The brackets 550 are used to wrap around the pipes 542, 544, 546 and the clamps 555 are used to tighten the brackets 550 to the pipes 542, 544, 546 as well as secure the threaded rods 560, 570. The angled coupling 400E is used to secure the threaded rods 560, 570 together. The first threaded rod 560 passes through the angled coupling 400E and the second threaded rod 570 is received at the defined angle (e.g., 45 degrees). The threaded rods 560, 570, the brackets 550, the clamps 555 and the angled coupling 400 E help secure the pipes 540, 542, 544, 546 together.

The embodiments of the angled coupling 400 illustrated in FIGS. 4A-4C require the couplers 410, 420 to be either screwed onto the threaded rod 450, 470 or to have the threaded rod 450, 470 be screwed thereinto. If the rod 450 is to pass through the coupler 410 (in opening 440 and out opening 480) as illustrated in FIG. 4C the angled coupling 400 will have to be screwed onto the rod 450. Likewise, for the practical application illustrated in FIG. 5B, the coupling 400 A would have to be screwed onto the threaded rod 500 and for the practical applications illustrated in FIGS. 5C-5E the angled coupling 400 C would have to be screwed onto the threaded rod 520. Depending on how far from an end of the rod the coupling is to be located (where the second coupler 420 is needed) the coupling may need to be rotated around the rod many times. This may be time consuming process that is possibly not practical in some situations.

Figures 6A, 6B:
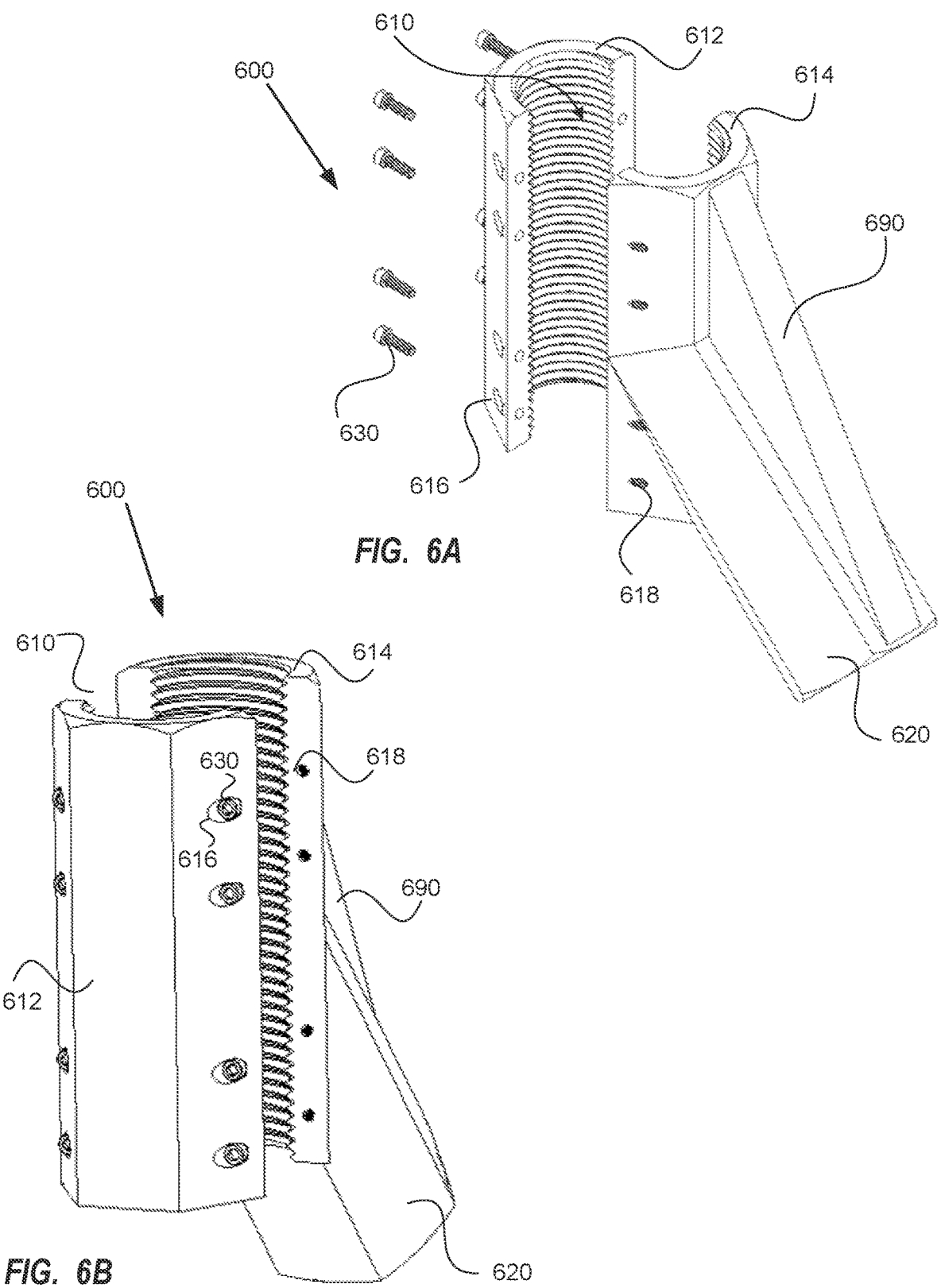
FIGS. 6A-6C illustrate several views of an example split angled coupling, according to one embodiment.
Figure 6C:
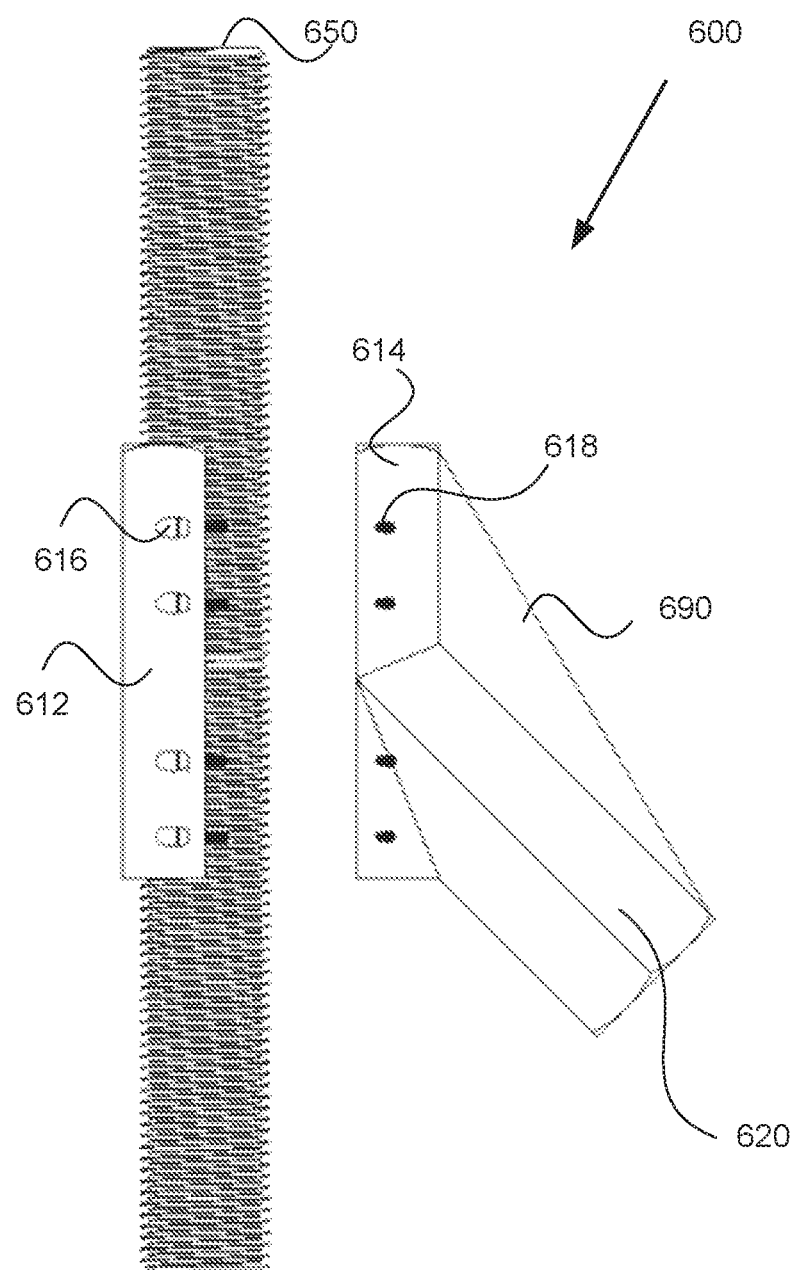

FIGS. 6A-6C illustrate several views of an example split angled coupling 600 that could be secured to any location on a threaded rod without requiring it to screwed there onto. The angled coupling 600 is similar to the angled coupling 400 in that it includes a first (main) internally threaded receptacle (coupler) 610 and a second internally threaded receptacle (coupler) 620 that is rotated at an angle (e.g., 45-degrees) from the first coupler 610. The first coupler 610 has a first opening (not labeled) on one side to receive a threaded rod 650. The first coupler 610 may include a second opening (not labeled) on an opposite side so that the threaded rod 650 can pass through the first coupler 610 (as illustrated in FIG. 6C) or a second threaded rod (not illustrated) can be received in the second opening. The second coupler 620 may have an opening (not labeled) for receiving a second threaded rod (not illustrated) that extends at the angle from the first threaded rod 650.

The first coupler 610 is split into a first half 612 and a second half 614 where the second half 614 and the second coupler 620 are located together. The first half 612 and the second half 614 may have aligned holes 616, 618 for securing the halves 612, 614 together with, for example, screws 630. The holes 616 may be recessed so as to receive heads of the screws 630 therein. The holes 618 may be threaded in order to hold the screws 630 therein and to secure the halves 612, 614 together.

The threads (not labeled) within the first coupler are clearly visible in FIGS. 6A-6B. As illustrated, the threads and the opening diameter are the same all the way through the first coupler 610 but are not limited thereto.

According to one embodiment, in order to provide additional support, a support bracket 690 may be utilized between the second half 614 of the first coupler 610 and the second coupler 620.

The split angled coupling 600 illustrated in FIGS. 6A-6C, would enable the first and second halves 612, 614 to be placed on any portion of the threaded rod 650 and then be secured together with the screws 630. The threads within the first coupler 610 provide additional support. The split embodiment enables the coupling 600 to be located anywhere on the threaded rod 650 without requiring the coupling to be rotated therearound a large number of times. Furthermore, if an item (e.g., support member, strut, bracket, connector, nut) was located on the threaded rod 650 prior to the point where the coupling 600 was to be located, you would not need to remove the item in order to utilize the coupling 600.

FIGS. 7A-7G illustrate several views of an example twist-on angled coupling 700 that could be secured to any location on a threaded rod without requiring it to be screwed there onto. The angled coupling 700 is similar to the angled coupling 400 in that it includes a first (main) internally threaded receptacle (coupler) 710 and a second internally threaded receptacle (coupler) 720 that is rotated at an angle (e.g., 45-degrees) from the first coupler 710. The first coupler 710 has an upper portion 712 that is approximately a first half (back half as illustrated) of the body of the coupler 710, a middle portion 714 that is only located along the side shared with the second receptacle (coupler) 720 and a lower portion 716 that is approximately a second half (front half as illustrated) of the body of the coupler 710 opposite the first half. According to one embodiment, in order to provide additional support, a support bracket 790 may be utilized between the upper portion 712 of the first coupler 710 and the second coupler 620.

Figure 7A:
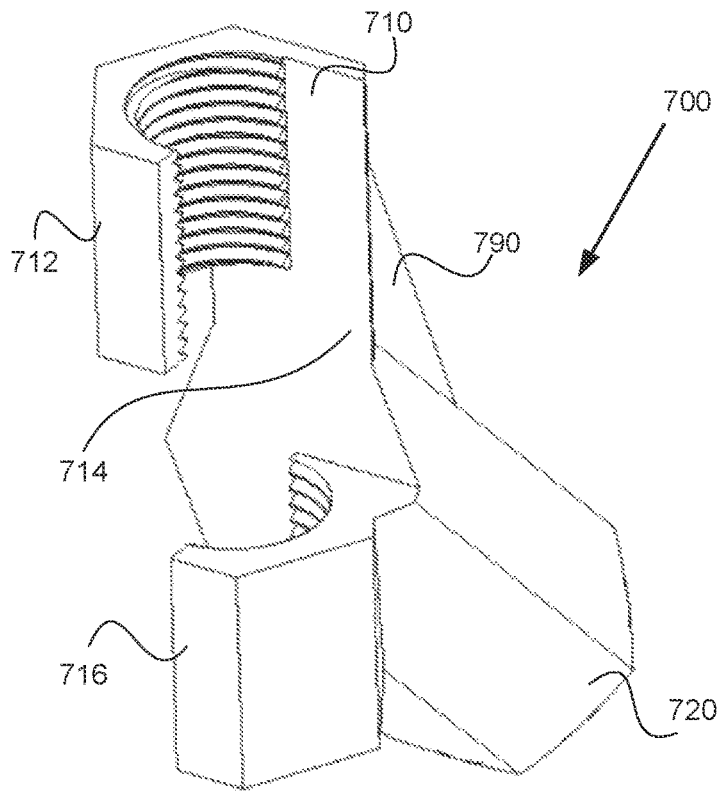
Figure 7B:
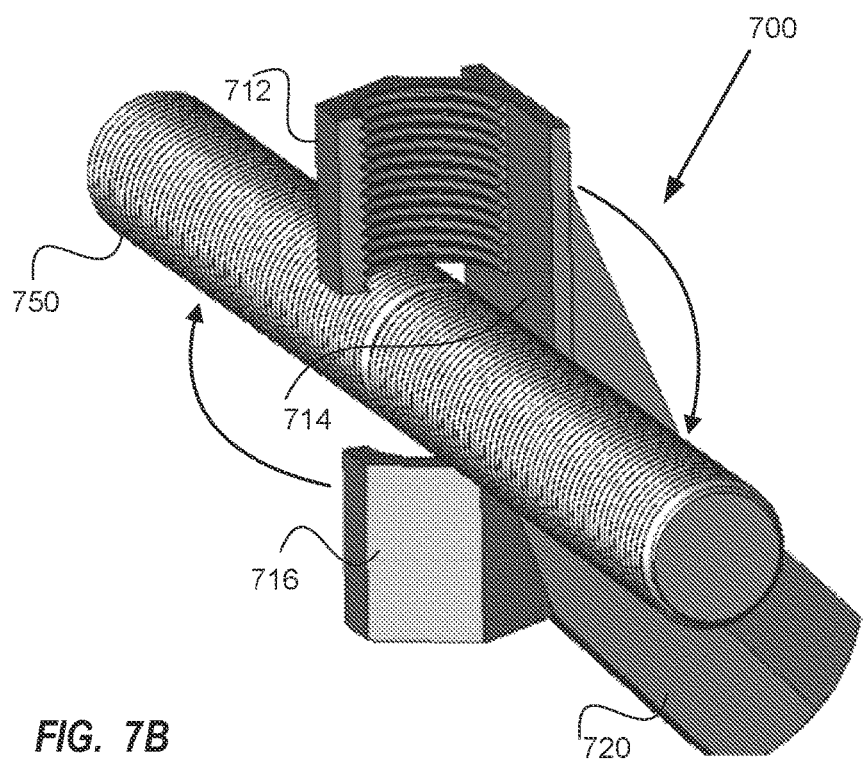

As illustrated in FIG. 7B, the coupling 700 can be placed on a threaded rod 750 such that the threaded rod 750 is located adjacent to, and perpendicular to, the middle portion 714. The coupling 700 can then be rotated in a direction (clockwise as illustrated) to engage the threads in the coupling 700 with the threaded rod 750. FIGS. 7C-7D illustrates various views after the twist-on angled coupling 700 is rotated onto the threaded rod 750.

Figure 7E:
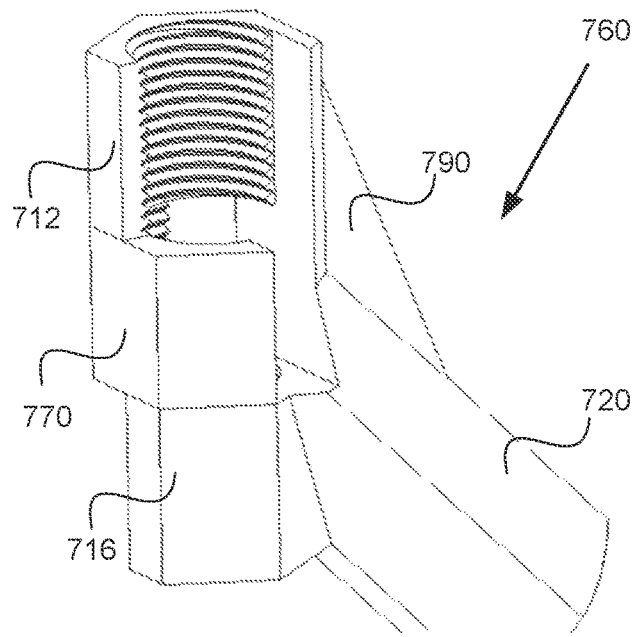
FIGS. 7E-7G illustrate several views of an example twist-on angled coupling, according to one embodiment.
Figure 7F:
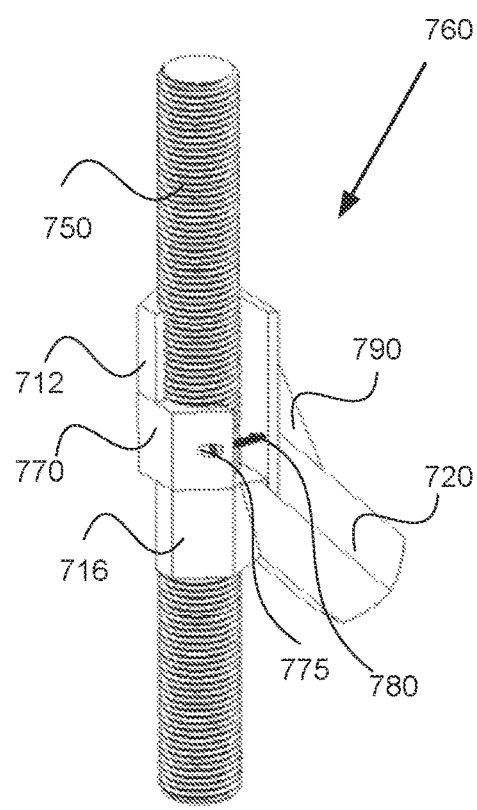
Figure 7G:
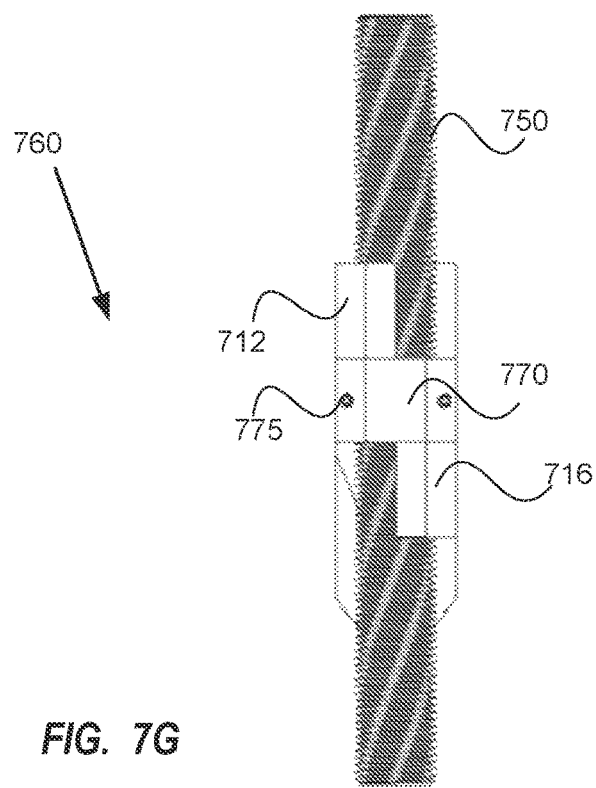

FIGS. 7E-7G illustrate various views of an embodiment of a twist-on angled coupling 760 that includes a support plate 770 that may be secured in place after the coupling 760 is twisted onto the threaded rod 750. As illustrated, the support plate 770 is shaped and sized so as to be received in the middle portion 714. The support plate 770 and the middle portion 714 may include aligned holes (only holes 775 in support plate are identified) for securing them together via, for example, screws 780. The holes 775 in the support plate 770 may be recessed so as to receive heads of the screws 780 therein. The holes (not labeled) in the middle portion 714 may be threaded in order to hold the screws 780 therein and to secure the support plate 770 and the middle portion 714 together.

The support plate 770 is illustrated as simply being located and aligned with the middle portion but is not limited thereto. Rather, the support plate can fill in any portion of the opening in the twist-on coupling without departing from the current scope.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment. Further, while the embodiment shown in FIGS. 1-4D do not include a support plate 770 as show in FIGS. 7E-7G, it is envisioned that the support plate 770 can be implemented along with the screws 780 in the embodiment shown in FIGS. 1-4D. It is also envisioned that the first portion 282 and the second portion 292 are in the shape of half of an elongated hexagonal nut, with three flat sides; however, other shapes and sizes can be implemented as long as the threaded rod can be seated on the internal thread 290.

The invention claimed is:

1. A coupler comprising a first portion and a second portion connected to a back wall;
   wherein the first portion and the second portion are spaced axially forming a space therein to receive a rod;
   wherein the first portion and the second portion are arched 180 degrees to receive the rod;
   wherein the first portion and the second portion are facing in opposite directions; wherein the first portion and the second portion each include an extension projecting in opposite directions; and,
   wherein each extension includes a U-shaped groove forming a flexible retaining portion to lock the rod.

2. The coupler of claim 1, wherein the first portion and the second portion include a thread.

3. The coupler of claim 1, wherein the flexible retaining portion of each extension extending towards a center of the first portion and the second portion, which are arched.

4. The coupler of claim 2, wherein the flexible retaining portion of each extension extending towards a center of the first portion and the second portion, which are arched.

5. The coupler of claim 1, wherein the back wall includes a receptacle extending at an angle relative to the back wall.

6. The coupler of claim 5, wherein the receptacle incudes a threaded hole.

7. The coupler of claim 5, wherein a gusset reinforces the receptable against the back wall.

8. The coupler of claim 5, wherein the receptacle directly connects with the second portion.

9. A coupler comprising a first portion and a second portion connected to a back wall;
   wherein the first portion and the second portion are spaced axially forming a space in between the first portion and the second portion to receive a threaded rod;
   wherein the first portion and the second portion are arched 180 degrees to receive the threaded rod;
   wherein the first portion and the second portion are facing in opposite directions; and,
   wherein the back wall includes a receptacle extending at an angle relative to the back wall; and,
   wherein the receptacle incudes a threaded hole to receive a second threaded rod.

10. The coupler of claim 9, wherein a gusset reinforces the receptable against the back wall.

11. The coupler of claim 9, wherein the receptacle directly connects with the second portion.

12. The coupler of claim 9, wherein the first portion and the second portion include a thread.

13. The coupler of claim 9, wherein the first portion and the second portion each include an extension projecting in opposite directions; and,
   wherein each extension includes a U-shaped groove forming a flexible retaining portion to lock the threaded rod.

14. The coupler of claim 13, wherein the flexible retaining portion of each extension extending towards a center of the first portion and the second portion, which are arched.

\* \* \* \* \*